United States Patent Office 3,563,970
Patented Feb. 16, 1971

3,563,970
OLEFIN POLYMERS HAVING A CONTROLLED GRANULOMETRY AND PROCESS FOR THEIR PREPARATION
Giorgio Leicht and Giancarlo Bizzarri, Terni, Italy, assignors to Montecatini Edison S.p.A., Milan, Italy
No Drawing. Filed Dec. 30, 1966, Ser. No. 605,966
Claims priority, application Italy, Jan. 4, 1966, 40/66
Int. Cl. C08f 3/08
U.S. Cl. 260—93.7
3 Claims

ABSTRACT OF THE DISCLOSURE

Process for controlling particle size distribution of isotactic polyolefins to eliminate "fines." Polymer is separated from non-isotactic fraction, dispersed in aqueous solution of surface-active agent, and subjected to temperature of from about 100 to 160° C. at pressure of from about 2 to 50 atmospheres for from about 8 minutes to 3 hours.

BACKGROUND OF THE INVENTION (1) Field of the invention

The present invention relates to a process for the preparation of olefin polymers, more particularly of polypropylene, having a controlled granulometry, and to the products obtained therefrom.

(2) Description of the prior art

In the polymerization of olefins with stereospecific catalysts, polymers having a wide granulometric distribution are normally obtained. The presence of a remarkable percentage of "fine" polymer, more particularly with an average diameter lower than 150$\mu$, does not allow a direct use of the polymer in many processing machines, such as spinning and film forming devices, since a perfect feeding of the polymer to the screws and therefore a perfect regularity of the processing and, consequently of the characteristics of the products obtained, are not obtained.

In order to avoid the inconvenience represented by the presence of fine polymer, recourse is had in general to the transformation of the polymer into granules, namely to the granulation or pelletizing. Systems are also known which allow the direct utilization of the polymer in the processing machines, based on the use of polymers with a granulometry free of fine material.

In order to obtain these fine-free polymers, it has been proposed to:

(a) The use, in the polymerization, of catalytic system suitable for obtaining polymers with such a granulometry as to contain restricted amounts of fine polymer, and more particularly for this purpose titanium halides with a given granulometry are used.

(b) The use of polymer flakes sieved so as to exclude the fine polymer.

The above described proposals, however, present drawbacks, such as the difficulty of obtaining a polymer completely free of granules having an average diameter lower than 150$\mu$, in case of the use of particular catalytic systems, and, in case of sieving, an only partial utilization of the polymerization product resulting in an increase of production costs.

SUMMARY OF THE INVENTION

It has now surprisingly been found, that it is possible to obtain olefin polymers, more particularly propylene, with a restricted granulometry, containing fractions having an average diameter not lower than 150$\mu$, by subjecting the polymer to a thermal treatment, in a dispersing medium, under the conditions hereinbelow described. Other suitable olefin polymers to which the invention may be applied are for example low density polyethylene, poly-4-methylpentene-1 and ethylene-propylene copolymers.

The treatment of the present invention makes it possible to eliminate the fractions of fine polymer and to transform the granulometry of the polymer so as to allow its direct utilization in common processing machines, more particularly the spinning and film forming machines.

The present invention provides a process for the preparation of olefin polymers with controlled granulometry, prevailingly consisting of isotactic macromolecules, more particularly of polypropylene with a controlled granulometry, which comprises dispersing the polymer coming from the catalyst inactivation stage (clarification or quenching) and separated (as by centrifuging) from the fraction of non-isotactic polymer in an aqueous solution of a surface-active or dispersing agent in the presence or absence of an organic solvent, and then subjecting it to a thermal treatment under pressures between about 2 and 50 atmospheres, at temperatures between about 100° and 160° C., for times from about 8 minutes to 3 hours, preferably from 10 to 60 minutes.

Particularly preferred dispersing media include the aqueous solutions containing surface-active agents consisting of condensation products of ethylene oxide with esters, ethers, aliphatic amines, aliphatic alcohols and carboxylic acids having the general formula

$$[\text{HO—CH}_2\text{—CH}_2\text{—(CH}_2\text{—CH}_2\text{O)}_n]_m\text{—XR}$$

wherein R is an alkyl radical containing from 8 to 28 carbon atoms, X is selected from the group consisting of O, N, NH, COO, $n$ is 1 or 2 and $m$ is an integer from 1 to 30, in the presence or absence of polymerization hydrocarbon solvents; suitable solvents are for example aliphatic hydrocarbons such as n-heptane, octane, dodecane and the like, and the aromatic hydrocarbons such as benzene, toluene, xylene, isopropylbenzene, tetrahydronaphthalene and the like.

Suitable examples of such surface-active agents include the condensates of ethylene oxide with sorbitan monolaurate, sorbitan monooleate, sorbitan monostearate, sorbitan monopalmitate, lauryl ether, stearyl ether, oleyl ether, nonylphenylether, dodecylamine, stearylamine, lauryl alcohol, stearyl alcohol and stearic acid.

The optimum operating conditions, more particularly temperature and duration of the treatment, vary with the particular dispersing medium used. Thus, for example, the polymer is dispersed in an aqueous solution of the condensation product of ethylene oxide with sorbitan monooleate, the best results are obtained by operating at 160° C. for 30 minutes. When a mixture of n-heptane/water/condensation product of ethylene oxide with sorbitan monooleate (n-heptane amounting to 35% by weight of the polymer) is used, optimum results are achieved by operating at 130° C. for 30 minutes. When using an aqueous solution of the condensation product of ethylene oxide with stearic acid, best results are obtained by operating at 130° C. for 30 minutes.

The polymer can be used in amounts of 5–40% by weight of the solution (containing or non-containing the organic solvent); solutions can be employed containing from 0.01 to 1% by weight of the condensation product of ethylene oxide; the organic solvent can be used in amounts from 0 to 90% by weight of the total amount of water+solvent.

In the details of practising the present invention, various modifications and changes can be made without departing from the spirit and scope of the invention. The following are presented to further illustrate the invention without limiting its scope.

DESCRIPTION OF THE PREFERRED EMBODIMENTS

Example 1

Into a 200-liter stainless steel autoclave there were introduced 50 liters of n-heptane, 84 g. of $AlEt_2Cl$ and 45 g. of $TiCl_3$. The mixture was heated to 70° C. and then the feeding of propylene thereinto was begun and continued until 75 liters of liquid monomer were absorbed.

The polymerization was continued for 5 hours at 70° C. The unpolymerized monomer was removed and recovered. The polymerization slurry was then clarified by addition of 500 cc. of n-butyl alcohol and centrifuged to remove the n-heptane that contains the dissolved non-isotactic fraction.

The cake thus obtained was introduced into a 360-liter reactor (stripper) containing 100 liters of 0.2% aqueous solution of the condensate of ethylene oxide with sorbitan monooleate. The n-heptane present amounted to 35% by weight of the polymer. The resulting aqueous slurry was heated at 130° C. for 30 minutes while agitating under a pressure of about 4 atmospheres. Steam was then introduced to remove the n-heptane. The polymer was then centrifuged, washed and dried.

The polymer had the following characteristics:

ash content: 0.013%
residue after heptane extraction: 97.1%
granulometric distribution:
    average diameter $>2300\mu$: 1%
    average diameter $600-2300\mu$: 29.5%
    average diameter $155-600\mu$: 69.5%
    average diameter $<155\mu$: 0

The polymer was spun with a melt spinning device of the type described in Italian Pat. No. 614,043. The spinning was perfectly regular and analogous to that carried out with the previously granulated polymers in accordance with the prior art procedures hereinbefore described. The characteristics of the fibers did not vary with respect to those of the fibers obtained from the prior art granulates.

EXAMPLE 2

(a) Treatment in accordance with the present invention.—Into a 200-liter stainless steel autoclave there were introduced 50 liters of n-heptane, 84 g. of $AlEt_2Cl$ and 45 g. of $TiCl_3$. The mixture was heated to 70° C. and then the feeding of propylene thereinto was begun and continued until 75 liters of liquid monomer were absorbed.

The polymerization was continued for 5 hours at 70° C. The unpolymerized monomer was removed and recovered. The polymerization slurry was then clarified by addition of 500 cc. of n-butyl alcohol and centrifuged to remove the n-heptane that contains dissolved the atactic fraction. The cake thus obtained was dried.

The polymer was introduced into a 360-liter reactor (stripper) containing 100 liters of a 0.2% aqueous solution of the condensate of ethylene oxide with sorbitan monooleate. The resulting aqueous slurry was heated at 160° C. for 30 minutes while agitating.

The polymer was then centrifuged, washed and dried under a pressure of about 7 atmospheres. The polymer had the following characteristics:

ash content: 0.03%
residue after heptane extraction: 97.2%
granulometric distribution:
    average diameter $>2300\mu$: 0.7%
    average diameter $600-2300\mu$: 28.3%
    average diameter $155-600\mu$: 71%
    average diameter $<155\mu$: 0

(b) Comparative example, not in accordance with the present invention.—For the sake of comparison, there is reported below a polymerization and finishing process without the treatment of the present invention.

Into a 200-liter stainless steel autoclave there were introduced 50 liters of n-heptane, 84 g. of $AlEt_2Cl$ and 45 g. of $TiCl_3$. The mixture was heated to 70° C. and then the feeding of propylene thereinto was started and continued until 75 liters of liquid monomer were absorbed.

The polymerization was continued for 5 hours at 70° C. The unpolymerized monomer was removed and recovered. The polymerization slurry was then clarified by addition of 500 cc. of n-butyl alcohol and centrifuged to remove the n-heptane that contains the dissolved atactic fraction.

The cake thus obtained was introduced into a 360-liter reactor (stripper) containing 100 liters of a 0.2% aqueous solution of the condensate of ethylene oxide with sorbitan monooleate, and was kept under atmospheric pressure at room temperature for 3 hours. Steam was then introduced to remove the n-heptane. The polymer was then centrifuged, washed and dried. The polymer had the following characteristics:

ash content: 0.012%
residue after heptane extraction: 97.3%
granulometric distribution:
    average diameter $>2300\mu$: 1%
    average diameter $600-2300\mu$: 27%
    average diameter $155-600\mu$: 48%
    average diameter $<155\mu$: 24%

This polymer was not suitable for the direct use in machines for processing into fibers and films but had to be granulated before such use.

EXAMPLE 3

Into a 200-liter stainless steel autoclave there were introduced 50 liters of n-heptane, 84 g. of $AlEt_2Cl$ and 45 g. of $TiCl_3$. The mixture was heated to 70° C. and the feeding of propylene was then begun and continued until 75 liters of liquid monomer were absorbed.

The polymerization was continued for 5 hours at 70° C. The unpolymerized monomer was removed and recovered. The polymerization slurry was then clarified by addition of 500 cc. of n-butyl alcohol and centrifuged to remove the n-heptane that contains dissolved the atactic fraction.

The cake thus obtained was introduced into a 360-liter reactor (stripper) containing 100 liters of a 0.35% aqueous solution of the condensate of ethylene oxide with stearic acid. The resulting aqueous slurry was heated at 130° C. for 30 minutes, while agitating, under a pressure of about 4 atmospheres. Steam was then introduced in order to remove the n-heptane. The polymer was then centrifuged, washed and dried. The polymer had the following characteristics:

ash content: 0.17%
residue after heptane extraction: 97.12%
granulometric distribution:
    average diameter $>2300\mu$: 3%
    average diameter $600-2300\mu$: 38%
    average diameter $155-600\mu$: 58.9%
    average diameter $<155\mu$: 0.1%

EXAMPLE 4

Into a 200-liter stainless steel autoclave there were introduced 50 liters of n-heptane, 84 g. of $AlEt_2Cl$ and 45 g. of $TiCl_3$. The $TiCl_3$ had an average diameter lower than $45\mu$. The mixture was heated to 70° C. and the feeding of propylene was then begun and continued until 75 liters of liquid monomer were absorbed.

The polymerization was continued for 5 hours at 70° C. The unpolymerized monomer was removed and recovered. The polymerization slurry was then clarified by addition of 500 cc. of n-butyl alcohol and centrifuged to remove the n-heptane that contains dissolved the atactic fraction.

The cake thus obtained was introduced into a 360-liter reactor (stripper) containing 100 liters of a 0.2% aqueous solution of the condensate of ethylene oxide with sorbitan monooleate. The n-heptane present amounted to 35% by weight of the polymer. The resulting aqueous slurry was heated at 160° C. for 30 minutes, while agitating, under a pressure of about 4 atmospheres. Steam was then introduced to remove the n-heptane. The polymer was then centrifuged, washed and dried. The polymer had the following characteristics:

ash content: 0.013%
residue after heptane extraction: 97.1%
granulometric distribution:
    average diameter >2300μ: 0%
    average diameter 600–2300μ 3.24%
    average diameter 155–600μ: 96.11%
    average diameter <155μ: 0.65%

Variations can, of course, be made without departing from spirit and scope of the invention.

Having thus described our invention, what we desire to secure by Letters Patent and hereby claim is:

1. A process for preparing polypropylene consisting prevailingly of isotactic macromolecules having a controlled particle size distribution and which is substantially free of particles having an average diameter greater than 2300 microns or less than 150 microns, which process comprises dispersing said polypropylene in the form of a solid polymer in an aqueous solution of a surface-active agent consisting essentially of a condensation product of ethylene oxide with a member selected from the group consisting of aliphatic esters, aliphatic ethers, aliphatic amines, aliphatic alcohols and aliphatic carboxylic acids, said aqueous dispersion further including an organic solvent, and subjecting the resulting dispersion to a thermal treatment at a temperature of from about 100 to 160° C. and a pressure of from about 2 to 50 atmospheres for from about 8 minutes to 3 hours.

2. The process of claim 1 wherein the thermal treatment is carried out for between about 10 and 60 minutes.

3. The process of claim 1 wherein the surface-active agent is selected from the group consisting of the condensation products of ethylene oxide with sorbitan monolurate, sorbitan monooleate, sorbitan monostearate, sorbitan monopalmitate, lauryl ether, stearyl ether, oleyl ether, nonylphenylether, dodecylamine, stearylamine, lauryl alcohol, stearyl alcohol and stearic acid.

References Cited
UNITED STATES PATENTS

| | | | |
|---|---|---|---|
| 3,244,687 | 1/1966 | Spindler | 260—94.9 |
| 3,422,049 | 1/1969 | McClain | 260—29.6 |
| 3,432,483 | 3/1969 | Peoples et al. | 260—87.3 |

JOSEPH L. SCHOFER, Primary Examiner

R. A. GAITHER, Assistant Examiner

U.S. Cl. X.R.
260—88.2, 94.9

PO-1050
(5/69)

UNITED STATES PATENT OFFICE
CERTIFICATE OF CORRECTION

Patent No. 3,563,970                Dated February 16, 1971

Inventor(s) GIORGIO LEICHT and GIANCARLO BIZZARRI

It is certified that error appears in the above-identified patent and that said Letters Patent are hereby corrected as shown below:

Column 4, Line 55: "0.17%" should read -- 0.017% --.

Column 6, Line 14: "lurate," should read -- laurate, --.

Signed and sealed this 29th day of February 1972.

(SEAL)
Attest:

EDWARD M. FLETCHER, JR.
Attesting Officer

ROBERT GOTTSCHALK
Commissioner of Patents